US008843721B2

(12) United States Patent
Fuente et al.

(10) Patent No.: US 8,843,721 B2
(45) Date of Patent: *Sep. 23, 2014

(54) DATA STORAGE USING BITMAPS (71) Applicant: International Business Machines Corporation, Armonk, NY (US)

(72) Inventors: Carlos Francisco Fuente, Portsmouth (GB); William James Scales, Portchester (GB); Barry Douglas Whyte, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/829,488

(22) Filed: Mar. 14, 2013

(65) Prior Publication Data

US 2013/0275698 A1 Oct. 17, 2013

Related U.S. Application Data (63) Continuation of application No. 13/497,791, filed as application No. PCT/EP2010/062385 on Aug. 25, 2010.

(30) Foreign Application Priority Data

Sep. 24, 2009 (EP) ..................................... 09171182

(51) Int. Cl.
*G06F 12/00* (2006.01)
*G06F 3/06* (2006.01)
*G06F 12/12* (2006.01)

(52) U.S. Cl.
CPC .............. *G06F 3/065* (2013.01); *G06F 3/0685* (2013.01); *G06F 3/0611* (2013.01); *G06F 3/0613* (2013.01); *G06F 12/124* (2013.01)
USPC ........... 711/165; 711/138; 711/134; 711/113; 711/159

(58) Field of Classification Search
CPC ... G06F 12/124; G06F 3/0611; G06F 3/0613; G06F 12/0866; G06F 12/0897; G06F 12/127
USPC .......................................................... 711/165
See application file for complete search history.

(56) References Cited

U.S. PATENT DOCUMENTS 5,318,857 A 6/1994 Haluska
6,542,967 B1 * 4/2003 Major ........................... 711/134

(Continued)

FOREIGN PATENT DOCUMENTS

CN 1794199 6/2006
EP 1645960 5/2007

(Continued)

OTHER PUBLICATIONS

U.S. Appl. No. 13/039,245, filed Mar. 2, 2011 by inventors J.P. Agombar, et al., 22 pages.

(Continued)

*Primary Examiner* — Reginald Bragdon
*Assistant Examiner* — Hannah A Faye-Joyner
(74) *Attorney, Agent, or Firm* — Rabindranath Dutta; Konrad, Raynes, Davda and Victor LLP (57) ABSTRACT

A data storage system comprises a controller, a first lower performance storage medium and a second higher performance storage medium. The controller is connected to the storage mediums and is arranged to control I/O access to the storage mediums. The controller is further arranged to store an image on the first storage medium, initiate a copy function from the first storage medium to the second storage medium, direct all I/O access for the image to the second storage medium, periodically age data from the second storage medium to the first storage medium, create a new empty bitmap for each period, and in response to an I/O access for data in the image, update the latest bitmap to indicate that the data has been accessed and update the previous bitmaps to indicate that the data has not been accessed.

10 Claims, 6 Drawing Sheets

(56) References Cited

U.S. PATENT DOCUMENTS

| | | |
|---|---|---|
| 7,107,395 B1 | 9/2006 | Ofek et al. |
| 7,165,059 B1 | 1/2007 | Shah et al. |
| 7,188,272 B2 | 3/2007 | Bartfai et al. |
| 7,225,211 B1 | 5/2007 | Colgrove et al. |
| 7,343,356 B2 | 3/2008 | Prahlad et al. |
| 7,360,048 B2 | 4/2008 | Agombar et al. |
| 7,386,674 B1 | 6/2008 | Lango |
| 7,386,695 B2 | 6/2008 | Fuente |
| 7,454,569 B2 | 11/2008 | Kavuri et al. |
| 7,509,523 B2 | 3/2009 | Agombar et al. |
| 7,571,290 B1 | 8/2009 | Ranade et al. |
| 7,676,641 B2 | 3/2010 | Agombar et al. |
| 7,793,144 B2 | 9/2010 | Agombar et al. |
| 2004/0039891 A1 | 2/2004 | Leung et al. |
| 2005/0071560 A1 | 3/2005 | Bolik |
| 2005/0278391 A1 | 12/2005 | Spear et al. |
| 2006/0112244 A1 | 5/2006 | Buah et al. |
| 2006/0139697 A1 | 6/2006 | Fuente |
| 2006/0161700 A1* | 7/2006 | Boyd et al. ................ 710/61 |
| 2006/0179061 A1 | 8/2006 | D'Souza et al. |
| 2007/0061531 A1 | 3/2007 | Bartfai et al. |
| 2007/0204119 A1 | 8/2007 | Murotani et al. |
| 2007/0294493 A1 | 12/2007 | Buah et al. |
| 2008/0022051 A1* | 1/2008 | Osanai et al. ............. 711/138 |
| 2008/0114951 A1 | 5/2008 | Lee |
| 2008/0215837 A1 | 9/2008 | Agombar et al. |
| 2009/0024813 A1 | 1/2009 | Uysal et al. |
| 2009/0037662 A1 | 2/2009 | La Frese et al. |
| 2009/0043978 A1 | 2/2009 | Sawdon et al. |
| 2010/0023561 A1 | 1/2010 | Zlotnick |
| 2010/0077160 A1 | 3/2010 | Liu et al. |
| 2010/0088468 A1 | 4/2010 | Agombar et al. |
| 2010/0174864 A1 | 7/2010 | Bar-El et al. |
| 2011/0208932 A1 | 8/2011 | Agombar et al. |

FOREIGN PATENT DOCUMENTS

| | | |
|---|---|---|
| WO | 2011036015 | 3/2011 |
| WO | 2011036020 | 3/2011 |

OTHER PUBLICATIONS

U.S. Appl. No. 13/039,108, filed Mar. 2, 2011 by inventors J.P. Agombar, et al., 22 pages.

U.S. Appl. No. 13/069,293, filed Mar. 22, 2011 by inventors J.P. Agombar, et al., 24 pages.

U.S. Appl. No. 13/244,094, filed Sep. 23, 2011 by inventors C.B. Beeken, et al., 50 pages.

U.S. Appl. No. 13/251,867, filed Oct. 3, 2011 by inventors C.B. Beeken, et al., 32 pages.

R. Hou, et a., "Data Replication and Recovery with Dell/EMC SnapView 2.0 and MirrorView", Dell Enterprise Systems, Feb. 2003, pp. 23 total.

W. Xiao, et al., "Case for Continuous Data Protection at Block Level in Disk Array Storages", IEEE Transactions on Parallel and Distributed Systems, vol. 20, No. 6, Jun. 2009, pp. 14 total.

PCT International Search Report dated Sep. 14, 2011 for Application No. PCT/EP2011/057950 filed May 17, 2011. pp. 12 total.

"Information Materials for IDS" dated Oct. 5, 2011 from Japanese Office Action dated Sep. 20, 2011 for Application No. 2011-533674 filed Oct. 20, 2009, pp. 2 total.

Preliminary Remarks dated May 4, 2012 pp. 1-2, for U.S. Appl. No. 13/464,633, filed May 4, 2012 by inventors Carlos F. Fuente et al.

U.S. Appl. No. 13/464,633, filed May 4, 2012 entitled, "Data Storage", invented by Carlos F. Fuente et al pp. 1-34.

Preliminary Amendment dated May 4, 2012 pp. 1-6 for U.S. Appl. No. 13/497,788 entitled "Data Storage", invented by Carlos F. Fuente et al.

Substitute Specification for U.S. Appl. No. 13/497,788, filed Mar. 22, 2012, entitled, "Data Storage", invented by Carlos F. Fuente et al., pp. 1-11.

A. Osuna et al., "N Series Snapshot: A Technical Discussion", Redbooks Paper, 2007, pp. 1-24.

International Search Report for International Application No. PCT/EP/2010/062385 filed on Aug. 25, 2010, dated Oct. 1, 2010, pp. 1-12.

International Search Report for International Application No. PCT/EP2010/062463 filed on Aug. 26, 2010, dated Jan. 26, 2011, pp. 1-15.

Substitute Specification for U.S. Appl. No. 13/497,788, filed Mar. 22, 2012, by inventors Carlos F. Fuente et al., pp. 1-23.

Preliminary Amendment for U.S. Appl. No. 13/497,788, filed Mar. 22, 2012, by inventors Carlos F. Fuente et al., pp. 1-9.

Chinese Office Action, dated Feb. 8, 2014, for Application No. 201080042501.6, pp. 1-8.

Office Action, dated Nov. 8, 2013, for U.S. Appl. No. 13/497,788 (37.283), filed Mar. 22, 2012, entilted,"Data Storage", invented by Carlos F. Fuente et al., pp. 1-47 pgs.

Response to Office Action, dated Feb. 10, 2013, for U.S. Appl. No. 13/497,788 (37.283), filed Mar. 22, 2012, entilted,"Data Storage", invented by Carlos F. Fuente et al., pp. 1-14 pgs.

Office Action, dated Nov. 7, 2013, for U.S. Appl. No. 13/464,633 (37.283C1), filed May 4, 2012, entitled "Data Storage", invented by Carlos F. Fuente et al., pp. 1-32.

Response to Office Action, dated Feb. 7, 2014, for U.S. Appl. No. 13/464,633 (37.283C1), filed May 4, 2012, entitled "Data Storage", invented by Carlos F. Fuente et al., pp. 1-11.

Office Action, dated Nov. 19, 2013, for U.S. Appl. No. 13/497,791 (37.284) filed Mar. 22, 2012, entitled "Data Storage Using Bitmaps", invented by Carlos F. Fuente et al., pp. 1-37.

Response to Office Action for 37.284 dated Feb. 19, 2014, for U.S. Appl. No. 13/497,791 (37.284) filed Mar. 22, 2012, entitled "Data Storage Using Bitmaps", invented by Carlos F. Fuente et al., pp. 1-12.

Final Office Action, dated May 9, 2014, for U.S. Appl. No. 13/497,788 (37.283), filed Mar. 22, 2012, entilted, "Data Storage", invented by Carlos F. Fuente et al., Total 27 pages.

Final Office Action, dated May 22, 2014, for U.S. Appl. No. 13/464,633 (37.283C1), filed May 4, 2012, entitled, "Data Storage", invented by Carlos F. Fuente et al., Total 20 pages.

Notice of Allowance, dated Jun. 10, 2014, for U.S. Appl. No. 13/497,791 (37.284), filed Mar. 22, 2012, entitled, "Data Storage Using Bitmaps", invented by Carlos F. Fuente et al., Total 18 pages.

* cited by examiner

DATA STORAGE USING BITMAPS

CROSS-REFERENCE TO RELATED APPLICATIONS

This application is a continuation of application Ser. No. 13/497,791 filed on Mar. 22, 2012, wherein application Ser. No. 13/497,791 is a national phase filing under 35 U.S.C. §371 of International Application PCT/EP2010/062385 filed on Aug. 25, 2010, claiming priority from 09171182.0 EP, filed Sep. 24, 2009, wherein application Ser. No. 13/497,791, International Application PCT/EP2010/062385, and 09171182.0 EP are incorporated herein by reference in their entirety.

BACKGROUND

This disclosure relates to a data storage system and to a method of operating the data storage system. In one embodiment, a FlashCopy® (FlashCopy is a registered trademark or trademark of International Business Machines Corporation in the United States and/or other countries.) process is used to separate frequently accessed data from less frequently accessed data using a single FlashCopy target with multiple bitmaps to reduce capacity usage.

Within a large data storage system there are likely to be multiple different types of storage media in use. The various types can be classified by a number of metrics, such as capacity, availability, performance and cost. Examples of different properties that distinguish the different classes of storage might include attachment technology (for example, SATA or FC/SCSI drives, redundancy scheme (for example, RAID-5, RAID-1 or RAID-10), and space-saving algorithm (for example, compression, de-duplication or non-compressed). A new class of storage technology that is emerging is storage-class memory, of which Flash Memory is a preferred example. The different applications and servers that are being hosted by the storage media will have varying requirements with respect to these metrics. Each application will tend to have its own requirements, and a given application's requirements will also tend to vary over time as the demands on that application vary.

SUMMARY OF THE DESCRIBED EMBODIMENTS

Provided are a method, system, and computer program product in which a data storage system comprising a controller, a first lower performance storage medium and a second higher performance storage medium are maintained. The controller is coupled to the first and the second storage mediums and arranged to control Input/Output (I/O or IO) access to the first and the second storage mediums. An image is stored on the first storage. A copy function is initiated from the first storage medium to the second storage medium. All I/O access for the image are directed to the second storage medium. Data is aged periodically from the second storage medium to the first storage medium. A new empty bitmap is created for each period. In response to an I/O access for data in the image, the latest bitmap is updated to indicate that the data has been accessed and the previous bitmaps are updated to indicate that the data has not been accessed.

DETAILED DESCRIPTION

It is a therefore a very complex task to optimise the allocation of storage amongst applications, to ensure the best use of the available resources, in order to meet the requirements of a business as a whole. The work required to perform a change to try and optimise the resource allocation can also be expensive. Re-allocating storage to a server can require server downtime, plus significant administrator effort in order to perform the change. The use of a product that implements storage virtualization, such as SAN Volume Controller (SVC), can eliminate the server downtime, and significantly reduce the administrative effort. Such products provide a data migration feature that allows data to be relocated from one class of storage to another, transparently to the using system. One limit of these changes, however, is that the most convenient unit of management is at the vdisk, volume or logical unit (LUN) level. A whole vdisk must be given the same class of storage. There are many examples though, where the vdisks in a data storage system may not comprise data with homogeneous requirements. In fact, it is likely that a completely homogenous vdisk is the exception rather than the norm. One particular case where there will be different regions of data with different requirements is for performance.

Conventional caching techniques can help with this problem to a limited degree. A write cache can allow a host to perceive a low write service time, even where backed by slow access storage. A write cache can also absorb a short burst of write activity quickly, and feed it to slower backend storage over a longer period of time, emulating higher performance storage. Both these capabilities are known, and implemented in, for example, SVC. But write caching as currently used is limited in its capabilities. Firstly, write IO must ultimately be sent to the backing storage from the write cache. It is possible to eliminate a small proportion of the traffic, but the majority must still be processed there. If the backing storage is unable to sustain the host application write traffic, then the write cache becomes full and the advantage is lost. Additionally, the size of a write cache is small compared to the total amount of system storage, possibly less than 1%. Together, these mean that a conventional write cache is not sufficient to allow storage within a low-performance class to be used for those portions of a disk that have higher performance requirements.

Some classes of storage, such as those that implement compression, or data de-duplication, present an extreme example of a low performance store. Though these might provide significant cost savings in terms of capacity required to satisfy a given server or application's storage requirements, the performance penalty for performing write IO against these stores means they cannot be used for general purpose IO. Their algorithms increase the cost of performing IO, and also place a limit on the peak throughput that they can sustain.

Certain embodiments provide a data storage system comprising a controller, a first lower performance storage medium and a second higher performance storage medium, the controller connected to the storage mediums and arranged to control IO access to the storage mediums, wherein the controller is arranged to store an image on the first storage medium, initiate a copy function from the first storage medium to the second storage medium, direct all IO access for the image to the second storage medium, periodically age data from the second storage medium to the first storage medium, create a new empty bitmap for each period, and in response to an IO access for data in the image, update the latest bitmap to indicate that the data has been accessed and update the previous bitmaps to indicate that the data has not been accessed.

Additional embodiments provide a method of operating a data storage system, the system comprising a controller, a first lower performance storage medium and a second higher performance storage medium, the controller connected to the storage mediums and arranged to control IO access to the storage mediums, wherein the method comprises storing an image on the first storage medium, initiating a copy function from the first storage medium to the second storage medium, directing all IO access for the image to the second storage medium, periodically aging data from the second storage medium to the first storage medium, creating a new empty bitmap for each period, and in response to an IO access for data in the image, updating the latest bitmap to indicate that the data has been accessed and updating the previous bitmaps to indicate that the data has not been accessed.

Additional embodiments provide a computer program product on a computer readable medium for operating a data storage system, the system comprising a controller, a first lower performance storage medium and a second higher performance storage medium, the controller connected to the storage mediums and arranged to control IO access to the storage mediums, wherein the product comprises instructions for storing an image on the first storage medium, initiating a copy function from the first storage medium to the second storage medium, directing all IO access for the image to the second storage medium, periodically aging data from the second storage medium to the first storage medium, creating a new empty bitmap for each period, and in response to an IO access for data in the image, updating the latest bitmap to indicate that the data has been accessed and updating the previous bitmaps to indicate that the data has not been accessed.

In certain embodiments, it is possible to provide a data storage system in which the system will automatically identify and segregate high-performance regions from low-performance regions with a low processing overhead, using a single higher performance storage medium. Therefore, the portions of the original storage medium containing data which is important for system performance receive better service than the rest, and therefore the system as a whole is advantaged. Frequently accessed, high-performance-requiring data on a vdisk is separated from less-performance-requiring data and is assigned to the very highest-performing class of storage, leaving the rest of the vdisk data on a lower-performing class of storage. This capability maximises the performance of the applications and servers on the storage medium, for the lowest cost.

In certain embodiments, the controller is arranged, when periodically aging data from the second storage medium to the first storage medium, to perform the aging procedure after a preset time period. The periodic aging process, which moves data stored by the higher performance second storage medium to the lower performance first storage medium, is best performed after a regular defined period, which can be set by an administrator or derived from usage statistics. This period is then used each time to trigger the aging process. In this way data on the higher performance second storage medium that has not been used recently can be merged back into the slower storage medium thereby freeing up more space on the faster storage medium.

Advantageously, the controller is arranged, when periodically aging data from the second storage medium to the first storage medium, to copy data from the second storage medium to the first storage medium that has not been accessed for a predetermined length of time. This length of time can be expressed as a set number of periods, where the period is the time gap between two aging procedures. For example, the length of time could be set at five periods, which means that any data that has not been accessed on the faster storage medium since the previous five aging procedures will be merged back to the slower storing medium in the current aging procedure.

Ideally, the controller is arranged, when periodically aging data from the second storage medium to the first storage medium, to perform the aging according to the oldest existing bitmap. The aging process can be carried out using the bitmaps, as this will document in the oldest existing bitmap which data has not been accessed since that bitmap was created. This can then be used to decide which data should be merged back onto the slower storage medium. In this case, it is advantageous that the controller is further arranged, following periodically aging data from the second storage medium to the first storage medium, to delete the oldest existing bitmap.

Embodiments will now be described, by way of example only, with reference to the accompanying drawings.

Figure 1A:
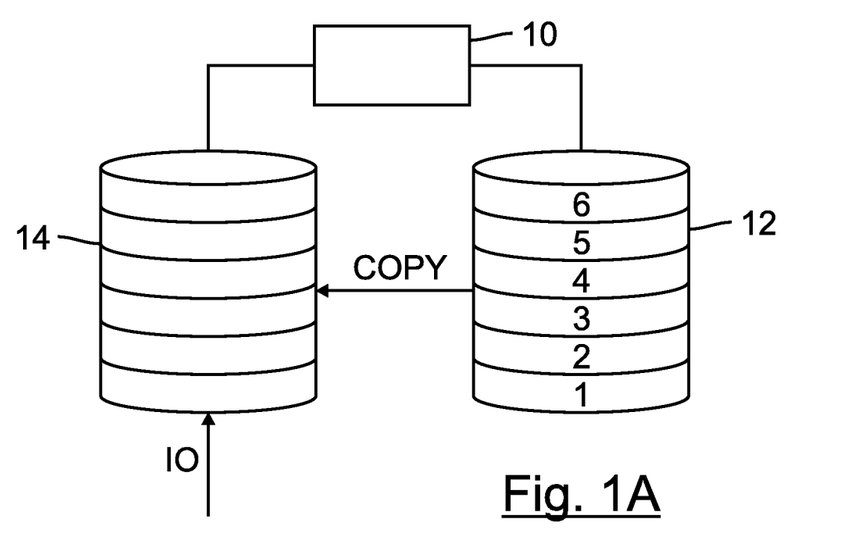
FIG. 1A is a schematic diagram of a storage system.

A data storage system is shown in FIG. 1A, which comprises a controller 10, a first, lower performance storage medium 12 and a second, higher performance storage medium 14. The controller 10 is connected to the storage mediums 12 and 14 and is arranged to control the IO access to the storage mediums 12 and 14. Although the two storage media 12 and 14 are shown as the same size, their physical size and/or data storage capacity may be different. The lower performance storage medium 12 could be a hard disk and the higher performance storage medium 14 could be a solid state memory device, for example. IO access to the data storage, whether read or write access, is managed by the controller 10.

The controller 10 is arranged to store an image on the first storage medium 12. This image will be data representing multiple applications and servers. The controller 10 is further arranged to initiate a copy function from the first storage medium 12 to the second storage medium 14. The copy function will copy data to the second storage medium 14 when there is a read or write access to any data within the image stored by the first storage medium 12. The controller is arranged to direct all IO access for the image to the second storage medium 14, and additionally will periodically age data from the second storage medium 14 to the first storage medium 12. This process of aging the data will be described in more detail below.

Figure 1B:
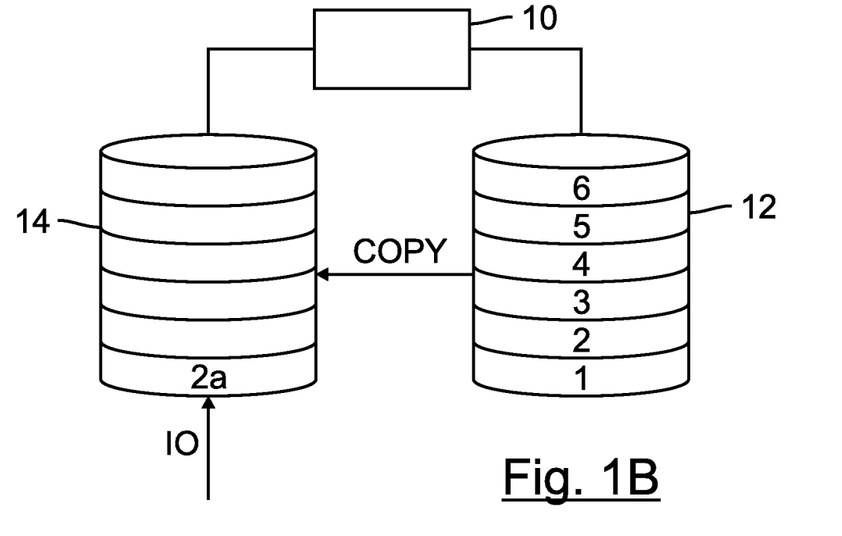
FIG. 1B shows a schematic diagram of the storage system after there has been IO access to a sector of a first storage medium.

FIG. 1B shows the situation after there has been IO access to the sector labelled 2 of the first storage medium 12. This IO access could be to overwrite some of the data in this sector. The controller resolves this by using the incoming IO and the original sector 2 to create the new sector 2a on the faster storage medium 14. Since all IO access is directed to the faster storage medium 14, any future read or write accesses to the data in sector 2 will be handled directly by the faster storage medium 14, without the need to make any access to the original image stored by the slower storage medium 12.

Figure 2:
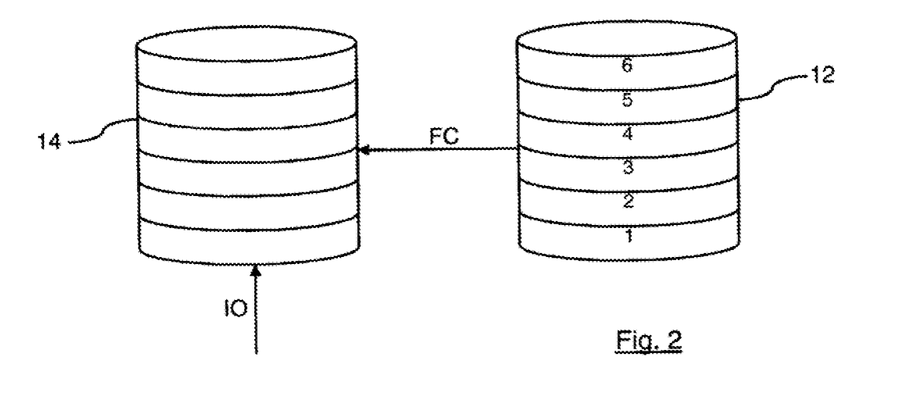
FIG. 2 is a schematic diagram of a second embodiment of the storage system.

An exemplary embodiment of the storage system is shown in FIG. 2. This embodiment uses the FlashCopy® and Space-Efficient (thin provisioning) features of IBM SAN Volume Controller, which are further extended to achieve the desired data separation between the most frequently used data and less frequently used data. The letters FC in the Figure refer to the FlashCopy® function with the arrow indicating the source storage medium 12 and the target storage medium 14 of the copy function. At the most fundamental level, a Space-Efficient FlashCopy® image (vdisk) is held on the high-performance, high-cost storage media 14, with the remainder of the storage held as a (typically) fully-allocated image (vdisk) on the low-performance lower-cost storage medium 12.

In this version of the storage system, all application IO is directed at the left-most FlashCopy® image stored on the storage medium 14. This image contains the most recently accessed data, by virtue of the FlashCopy® function between the two storage volumes. The image stored by the higher performance storage medium grows as the recent working set for the application expands. The right image of the first storage medium 12 contains the full image of the application disk, however this medium 12 does not contain the most recent updates, which are held on the left-most disk 14. Before any merging of data back onto the disk 12 takes place that storage disk 12 maintains a point-it-time copy as of the time that the FlashCopy® was taken.

Write accesses to the image are handled using a conventional FlashCopy® algorithm, using a copy-on-write technique. Therefore, if the data to be over-written is already located on the left-most disk 14, then it is over-written in place. If data has not been recently accessed, it will be found on the right-most disk 12. Wherever the data is found, it is read from its current location, merged with the new write data, and written to the left-most disk 14. In this mode of operation therefore, the left-most disk 14 is accumulating changes that amount to the recent working set of the application. Many future IO accesses will be serviced directly by the left-most disk 14. Some IO accesses will not have been accumulated there and will instead be serviced by the right-most-disk 12.

If the arrangement described above were static, then the left-most disk 14 would, over time, grow to be closer, in terms of the size of the data being stored, to the full-size of the right-most disk 12. This will happen, as even infrequently accessed data, once accessed, would begin to consume space on the storage medium 14. Eventually all of the data on the lower performance disk 12 would be accessed, and the data stored by the higher performance disk 14 would be the entirety of the original data image stored on the slower storage medium 12, with IO amendments. Therefore an ageing process is needed to remove infrequently accessed data from the left-most disk 16.

Figure 3A:
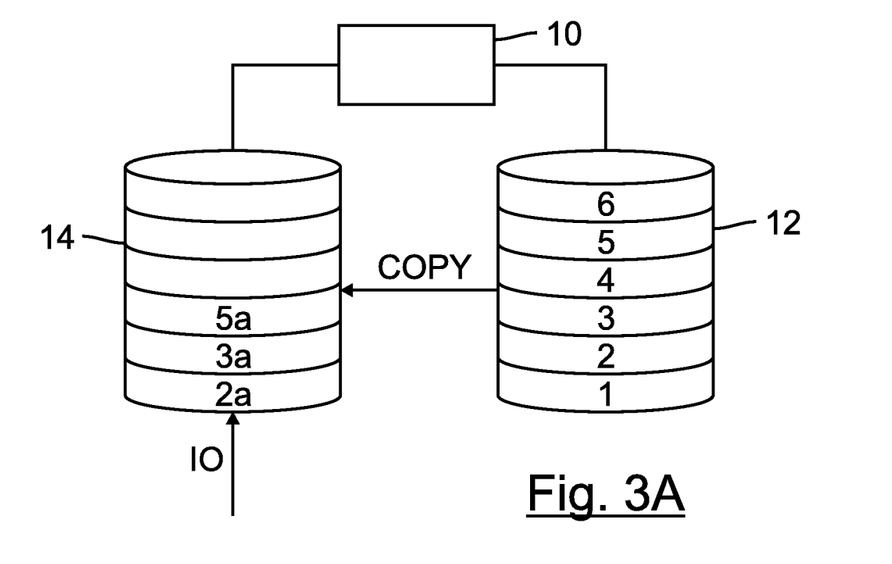
FIG. 3A is a further schematic diagram of the storage system showing an aging process.
Figure 3B:
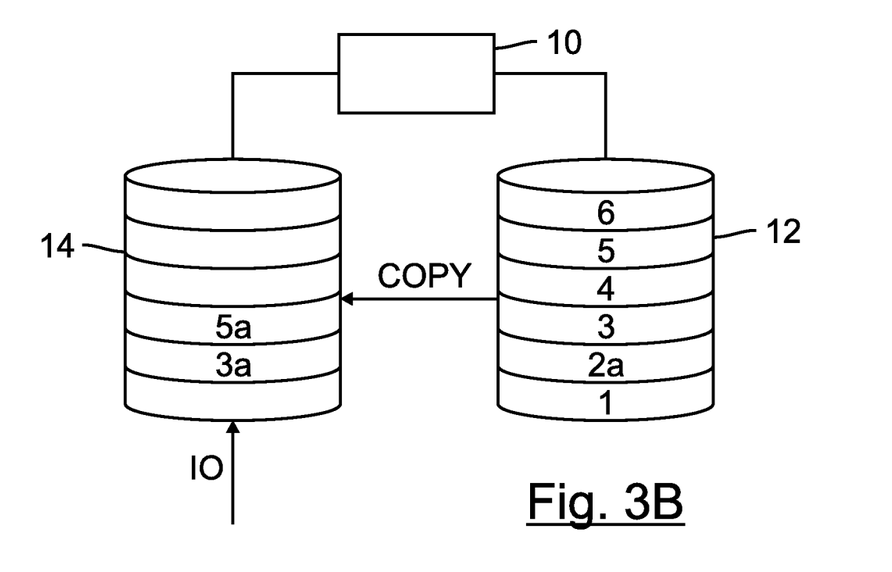
FIG. 3B is another further schematic diagram of the storage system showing an aging process.

FIG. 3A and FIG. 3B illustrate the aging process. The aging process can be triggered after a specific time has elapsed, or based on the data being stored by the higher performance medium 14 reaching a certain size, or other metrics or combination of metrics. Different triggering methods can be used in different system arrangements at different times. FIG. 3A shows the higher performance storage medium after there has been IO access to the data stored in sectors 2, 3 and 5. These sectors have been copied across to the higher performance storage medium 14 and combined with the new data contained in the IO accesses (assuming that they were data writes). Any further IO accesses to these sectors, whether read or write, will be handled by the left-most medium 14.

After the periodic aging process has taken place, then the data storage system will be as shown in FIG. 3B. The data stored by the sector 2a, on the higher performance storage medium 14, has been copied back to the lower performance storage medium 12. This process updates the image stored by the lower performance medium 12, and the original space for the data stored on the medium 14 can be de-allocated. Although, in this example, the data merged back to the slower medium 12 was the first bit of data to be copied across to the faster disk 14, this is not necessarily the action undertaken in the merging process. The data being merged back is the data that has not been accessed most recently. If there had been a recent read access to the sector 2a on the second medium 14, then this sector would not have been merged back.

Figure 4:
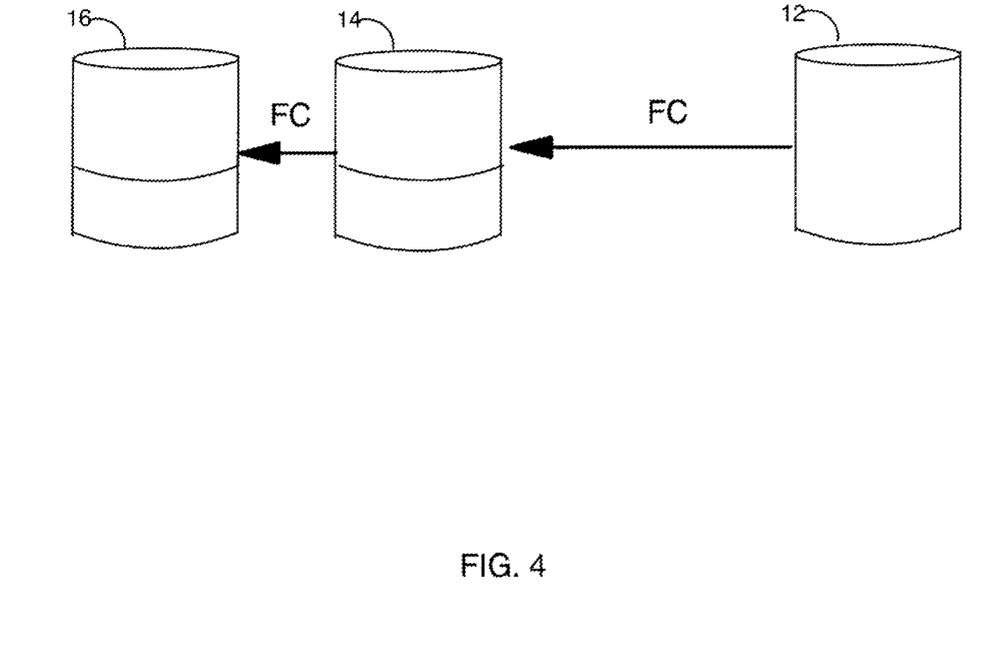
FIG. 4 is a schematic diagram of an alternative storage system.

The storage system uses a FlashCopy® target with multiple bitmaps to reduce capacity usage. The system as described above, with reference to FIGS. 1A to 3B, can provide the separation of frequently and less frequently accessed data for the purposes of creating tiers between different classes of storage and providing fine granularity of progression of data between tiers and over longer periods of time than a single target instance. However, if such a system is extended with multiple target space-efficient disks, for example using two faster storage media 14 and 16, as shown in FIG. 4, then that storage system requires more capacity over time, especially as the number of targets is increased. A larger numbers of tiers of targets and/or a larger numbers of targets are required to maintain finer granularity of the "frequency" of access over longer periods of time of hours, and days etc.

In a system using multiple tiers or multiple targets, during the time period of hours and days etc., the amount of newly written data, or frequently re-read data, has to be stored on each target and some percentage of this has to be moved between targets when data is re-written, or frequently re-read. This places overheads on the infrastructure which has to maintain lots of targets and increases the necessary bandwidth for the additional grains copied between targets. The storage system, in certain embodiments, provides an adaptation of the system of FIG. 4 that eliminates the complexity of the multiple targets with no additional bandwidth requirements, while still providing the advantages of that system.

In an environment such as that of FIG. 4, the system allows multiple target space-efficient disks 14 and 16 to be used as storage "buckets" for frequently accessed data. In such a scheme, either X targets need to be created and managed at the initialisation of the process, or as time period Y has elapsed a new target must be created. As frequently accessed data is "re-hit" at the newest target, (re-hit meaning the data block already resides on one of the other earlier targets) then the block must be copied from the earlier target, merged with the new data I/O and written to the latest target. This places additional bandwidth requirements on the system.

The storage system according to the present invention provides a scheme by which a single target resource can be used to achieve the benefits of splitting the data between different classes of data storage media, but however it removes the need for any data to be re-copied between targets. The data stays in place on the one target storage medium 14 and so the management of the system is greatly simplified and the I/O re-direction does not need to continually adjust to point to the latest target. Overall capacity utilisation may also be reduced as the system does not end up with two (or more) allocated grains on multiple targets where some grains are simply marked as 'stale' but are still allocated.

Figure 5:
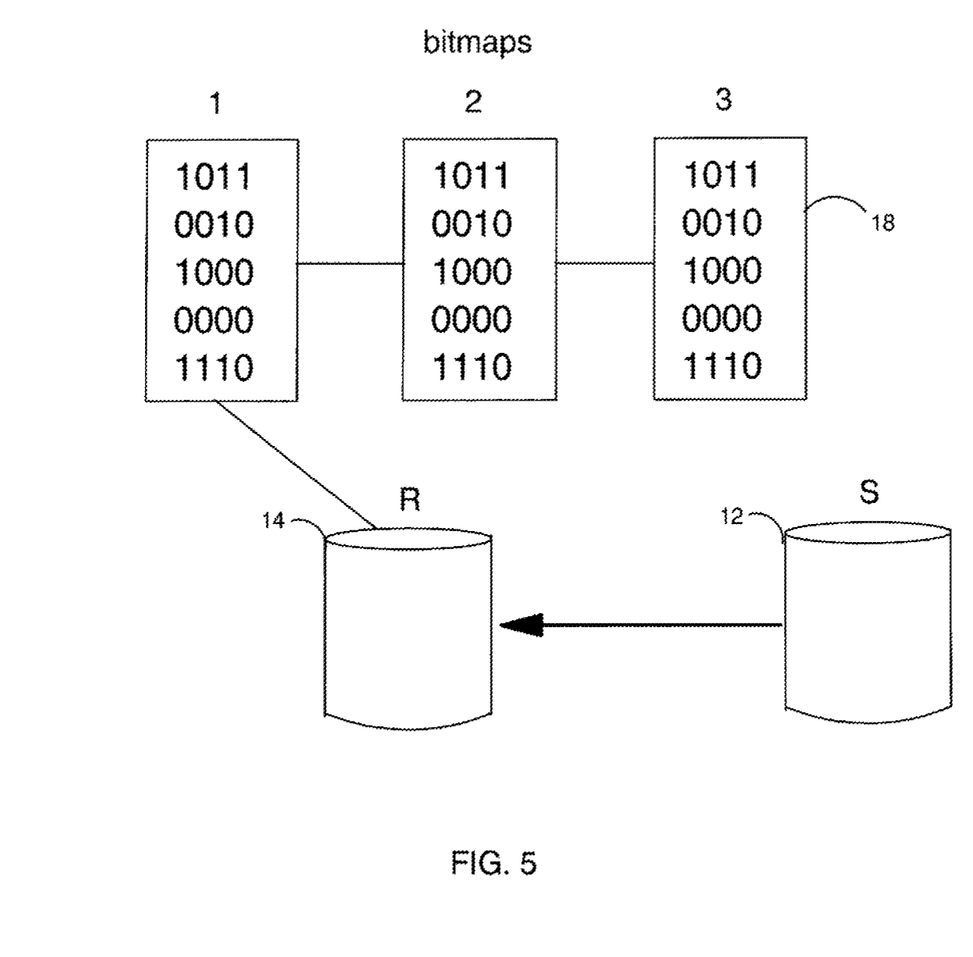
FIG. 5 is a further schematic diagram of the storage system showing bitmaps.

FIG. 5 shows the storage system, which uses bitmaps 18. Instead of using a cascade of, for example, four storage media P, Q, R and S (where S is the lower performance storage medium 12 and P, Q and R are different targets), only two disks R+S are used. It can be seen that although the storage system only has one space-efficient target 14, the system maintains multiple bitmaps that are associated with this single target 14. Each bitmap refers to the data that resides on the space-efficient target 14 at the end of one of an elapsed time periods. For example, bitmap1 covers data that was updated during period 2X to 3X (equivalent to target R), bitmap2 covers data that was updated during period X to 2X (equivalent to target Q), and bitmap3 covers data that was updated during period X (equivalent to target P).

When frequently accessed data is re-hit, as per the explanation above, instead of now having to copy the whole grain from target P to target R, the controller can simply update bitmap3 to show that the data has been accessed during the latest time period and then unset the bit in the bitmap1. Only the new I/O for this grain is now written to the single target disk 14. Thus, if an I/O was only 4K, and the grain size if 64K, there has been saved 60K of bandwidth in the system. Thus the system has now (by changing two bits in meta-data) "moved" the data to be on the latest target, without any physical data moving. Similarly the system does not end up with two copies of the same grain (on different targets and corresponding to different points in time) there is only the latest version of the grain on the disk 14, thus there has been a cut in the used capacity (on the target(s)) by 50% for data that is frequently accessed. As the system moves on to the next time period (say 4X) the controller will simply have to initialize a new bitmap 18 to all zeros. The system does not need to create a new target nor does it have to move the I/O re-direction layer point to a new target. The whole system simply resides on the single target 14.

Figure 6:
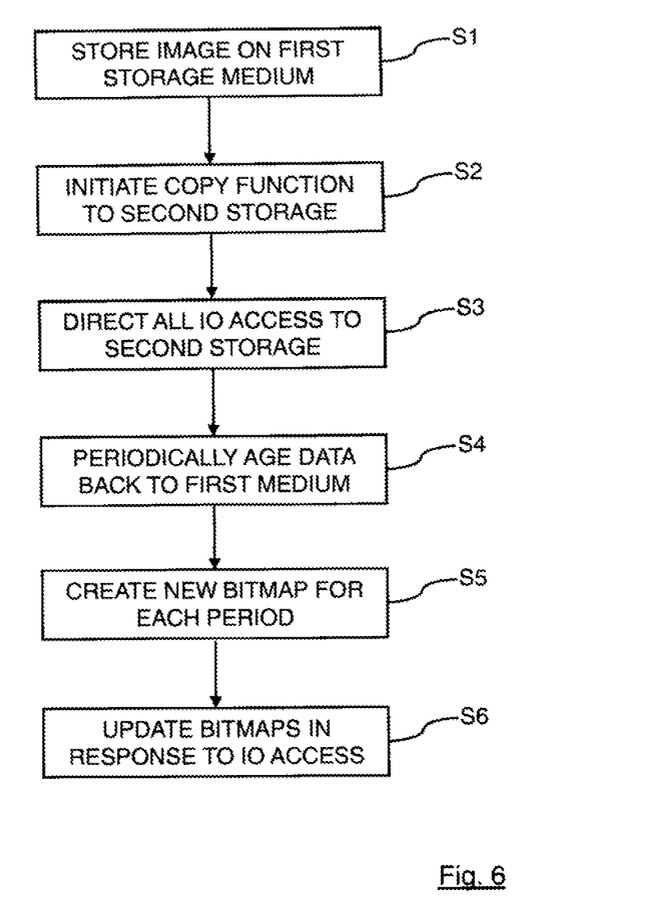
FIG. 6 is a flowchart of a method of operating the storage system.

The method of operating the storage system is summarised in FIG. 6. The method comprises the first step S1 of storing an image on the first storage medium 12, followed by the steps S2 of initiating a copy function from the first storage medium 12 to the second storage medium 14 and S3 of directing all IO access for the image to the second storage medium 14. The next step is the step S4 of periodically aging data from the second storage medium 14 to the first storage medium 12, step S5 of creating a new empty bitmap 18 for each period, and finally, step S6 of, in response to an IO access for data in the image, updating the latest bitmap 18 to indicate that the data has been accessed and updating the previous bitmaps 18 to indicate that the data has not been accessed.

What is claimed is:

1. A method, comprising:
    maintaining a data storage system comprising a controller, a first lower performance storage medium and a second higher performance storage medium, the controller coupled to the first and the second storage mediums and arranged to control I/O access to the first and the second storage mediums;
    storing an image comprising a plurality of regions of data on the first storage medium,
    initiating a copy function to copy one or more regions of the plurality of regions of data stored in the image on the first storage medium from the first storage medium to the second storage medium, in response to an IO access to the one or more regions of the plurality of regions of data stored in the image on the first storage medium,
    directing further I/O accesses for the image first to the second storage medium and then to the first storage medium,
    periodically aging data from the second storage medium to the first storage medium,
    creating a new empty bitmap for a plurality of periods of time, and
    in response to an I/O access for a region of data in the image, updating a latest bitmap to indicate that the region of data has been accessed and updating a previous bitmap to indicate that the region of data has not been accessed.

2. The method of claim 1, the method further comprising:
    performing the aging after a preset time period, in response to periodically aging data from the second storage medium to the first storage medium.

3. The method of claim 2, the method further comprising:
    copying data from the second storage medium to the first storage medium that has not been accessed for a predetermined length of time, in response to periodically aging data from the second storage medium to the first storage medium.

4. The method of claim 3, the method further comprising:
    performing the aging according to an oldest existing bitmap, in response to periodically aging data from the second storage medium to the first storage medium.

5. The method of claim 4, the method further comprising:
    deleting the oldest existing bitmap, following periodically aging data from the second storage medium to the first storage medium.

6. The method of claim 1, the method further comprising:
    performing the aging according to an oldest existing bitmap, in response to periodically aging data from the second storage medium to the first storage medium.

7. The method of claim 1, the method further comprising:
    deleting an oldest existing bitmap, following periodically aging data from the second storage medium to the first storage medium.

8. The method of claim 1, wherein the image comprises a vdisk.

9. The method of claim 8, wherein the first lower performance storage medium is a hard disk, and the second higher performance storage medium is a solid state memory device, and the hard disk and the solid state memory device are external to the controller.

10. The method of claim 1, wherein future IO accesses to the data in the one or more regions are handled directly by the second storage medium, without accessing the image stored on the first storage medium.

* * * * *